US011144035B2

(12) United States Patent
Gupta et al.

(10) Patent No.: US 11,144,035 B2
(45) Date of Patent: Oct. 12, 2021

(54) QUALITY ASSESSMENT FEEDBACK CONTROL LOOP FOR ADDITIVE MANUFACTURING

(71) Applicant: General Electric Company, Schenectady, NY (US)

(72) Inventors: Vipul Kumar Gupta, Guilderland, NY (US); Natarajan Chennimalai Kumar, Niskayuna, NY (US); Anthony J Vinciquerra, III, Rexford, NY (US); Randal T Rausch, Schenectady, NY (US); Subhrajit Roychowdhury, Schenectady, NY (US); Justin John Gambone, Jr., Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/441,792

(22) Filed: Jun. 14, 2019

(65) Prior Publication Data

US 2020/0393813 A1 Dec. 17, 2020

(51) Int. Cl.
*G05B 19/4099* (2006.01)
*G06N 5/02* (2006.01)

(52) U.S. Cl.
CPC ........... *G05B 19/4099* (2013.01); *G06N 5/02* (2013.01); *G05B 2219/45041* (2013.01)

(58) Field of Classification Search
CPC .................................................. G05B 19/4099
(Continued)

(56) References Cited

U.S. PATENT DOCUMENTS 9,964,496 B2 5/2018 Hess et al.
10,112,262 B2 10/2018 Cheverton et al.
(Continued)

FOREIGN PATENT DOCUMENTS

CN 107737927 A 2/2018
CN 109483888 A 3/2019
(Continued)

OTHER PUBLICATIONS

Craeghs, Tom et al., "Online quality control of selective laser melting", Aug. 17, 2011, (pp. 212 to 226, 15 total pages).
(Continued)

*Primary Examiner* — Hien D Khuu
(74) *Attorney, Agent, or Firm* — Dority & Manning, P.A.

(57) ABSTRACT

A method of additive manufacturing machine (AMM) build process control includes obtaining AMM machine and process parameter settings, accessing sensor data for monitored physical conditions in the AMM, calculating a difference between expected AMM physical conditions and elements of the monitored conditions, providing the machine and process parameter settings, monitored conditions, and differences to one or more material property prediction models, computing a predicted value or range for the monitored conditions, comparing the predicted value or range to a predetermined target range, based on a determination that predicted value(s) are within the predetermined range, maintaining the machine and process parameter settings, or based on a determination that one or more of the predicted value(s) is outside the predetermined range, generating commands to compensate the machine and process parameter settings, and repeating the closed feedback loop at intervals of time during the build process. A system and a non-transitory medium are also disclosed.

20 Claims, 5 Drawing Sheets

(58) Field of Classification Search
USPC .......................................................... 700/166
See application file for complete search history.

(56) References Cited

U.S. PATENT DOCUMENTS

| | | | |
|---|---|---|---|
| 10,252,335 | B2 | 4/2019 | Buller et al. |
| 10,725,459 | B2* | 7/2020 | Good ................. G05B 19/4099 |
| 2009/0206065 | A1 | 8/2009 | Kruth et al. |
| 2017/0157704 | A1 | 6/2017 | Ladewig et al. |
| 2017/0341183 | A1 | 11/2017 | Buller et al. |
| 2018/0082185 | A1* | 3/2018 | Tanimoto ............... G06N 7/005 |
| 2018/0120260 | A1 | 5/2018 | Goldfine et al. |
| 2018/0185959 | A1 | 7/2018 | Mathews, Jr. et al. |
| 2018/0229303 | A1 | 8/2018 | Burlatsky et al. |
| 2019/0004496 | A1* | 1/2019 | Blom ................. G05B 19/4099 |
| 2019/0049929 | A1* | 2/2019 | Good ................. G05B 19/4185 |
| 2019/0299519 | A1* | 10/2019 | Yeoh .................... B29C 64/141 |
| 2020/0353678 | A1* | 11/2020 | Yeoh ...................... B33Y 30/00 |

FOREIGN PATENT DOCUMENTS

| | | | |
|---|---|---|---|
| EP | 3459715 | A1 | 3/2019 |
| EP | 3495904 | A1 | 6/2019 |
| WO | 2017216059 | A1 | 12/2017 |

OTHER PUBLICATIONS

Liu, Chenang et al., "Textural Analysis-based Online Closed-Loop Quality Control for Additive Manufacturing Processes", Proceedings of the 2017 Industrial and Systems Engineering Conference, May 2017, 6pgs.

* cited by examiner

QUALITY ASSESSMENT FEEDBACK CONTROL LOOP FOR ADDITIVE MANUFACTURING

BACKGROUND

Process shift of machine parameters is a common and unavoidable issue during additive manufacturing (AM) operations. This shift in machine parameters can result in uncertain part quality, part-to-part variation, and performance. Because the properties and performance (e.g., density, tensile strength, fatigue life, etc.) of the part undergoing production are highly dependent on the AM process parameters, an unexpected shift or drift in process parameter(s) can be detrimental to the AM operation yield.

Conventionally, AM-produced parts are non-destructively, and/or sacrificially, evaluated after they are fully printed to evaluate the overall build quality. This post-build physical and mechanical testing and materials characterization processes are very expensive, time consuming and inefficient. Under this post-build conventional approach, parts can be scrapped for a small defect that occurred due to a process shift, and thus, resulting in low yield rates of the additive process.

What is missing from the art are approaches that monitor process parameters to quantify shift, and or drift, during the build operation and apply the quantified shifts/drifts in process parameter(s) in a predictive model for evaluation of the part's properties to determine if adjustment to the AM process parameters are needed during the build to meet the desired part performance and materials characteristics.

DESCRIPTION

Embodying systems and methods control part quality during additive manufacturing (AM) build process by monitoring AM process parameters (e.g., laser power, scan speed, spot-size, etc.), process variables and signatures (melt-pool shape, width and depth, temperature profile, temperature gradients, etc.) to identify deviation(s) from nominal values. Embodiments apply the monitored information of one or more properties to material performance prediction models. In accordance with embodiments, input process parameter settings for the AM machine can be adjusted to correct deviations in the process to improve the production part's properties.

In accordance with embodiments, a material property prediction model is incorporated in an AM machine feedback control loop to provide settings for maintaining the material quality during the build process. Control over the part's quality and/or performance is obtained by adjusting AM input parameters in real time (i.e., during build operations) based on the results of the material property prediction model(s). In accordance with embodiments, these prediction results are informed by real time measurement of process parameter shifts and/or drifts. Correction of the process parameters in real time can reduce potential part failure, thus, increasing production yields; this real time correction can reduce (or eliminate) expensive, labor and time intensive, post-process part inspection and testing.

In accordance with embodiments, the predictive model(s) is provided with process input parameters as measured by direct and/or indirect techniques—direct measurement by physical sensors for measurement of, by way of example, laser power, scan speed, spot size; or indirect measurement of process signature, by way of example, melt-pool depth and width, absolute temperature, and temperature gradients. In accordance with embodiments, part properties (e.g., anomalies, static tensile/compression properties, fatigue life, etc.) can be predicted from the measurement inputs. If the part's predicted properties are found to be outside a predetermined target range (or away from desired critical-to-quality (CTQ) specifications), a controller can adjust input parameters of the AM machine to meet the desired CTQs.

In accordance with embodiments, a target range for the production part's characteristics can be predetermined from the characteristics of the AM build parameters (both machine and process parameters) (i.e., laser power stability, beam diameter consistency and peak-intensity, scan-speed uniformity, gas-flow uniformity, powder-spreading uniformity, build material characteristics, etc.). From these build related parameter characteristics an ideal result can be calculated; assignment of a tolerance range to the calculated result provides the predetermined target range. During the build process, sensor data collected for the AM machine and process parameters is provided to the predictive model, which is then used to predict a production part's properties based on the measured machine and process parameters. If the part's predicted properties are outside the predetermined target range, then changes to the machine and process parameters are calculated and provided to a control unit. In some implementations, each part property can have its own target range. A net adjustment to each of the machine and process parameters can be determined from predictions for multiple properties so that each property is within its own predetermined target range.

In accordance with embodiments, a target range can be determined by an inversion process. Under this approach a target range is selected based on the part's specification(s). An "inverse" predictive model can determine the machine and process parameters to produce a part having part properties meeting the specification(s). By way of example, if a part is specified to have a particular low cycle fatigue life, the predictive model can determine process parameter values needed to achieve the specified low cycle fatigue life. The extent of the target range can be based on production part tolerances.

Figure 1:
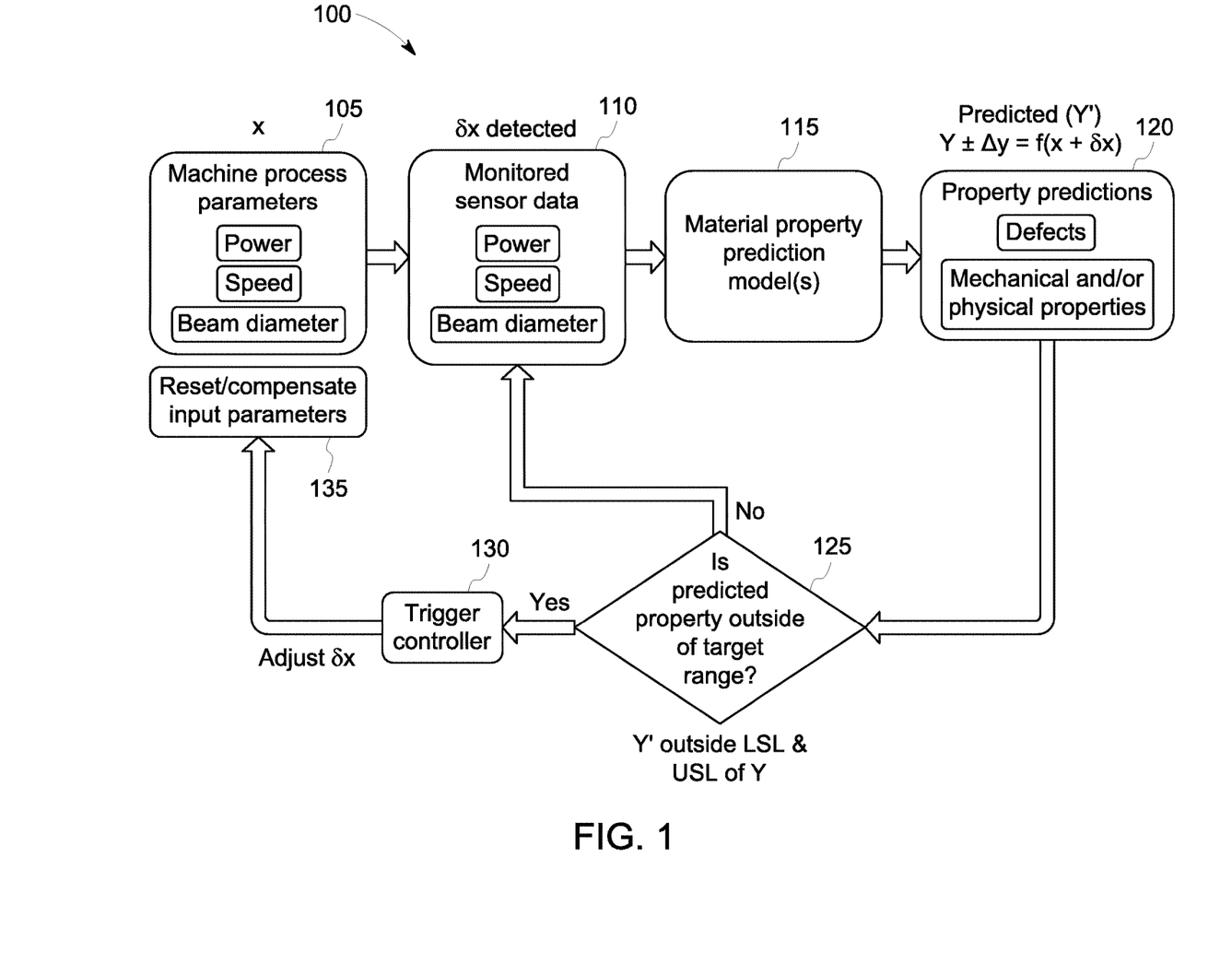
FIG. 1 is a flow diagram for control of an additive manufacturing machine build process in accordance with embodiments.

FIG. 1 is a flow diagram of process 100 for control of an additive manufacturing machine build process in accordance with embodiments. Embodying methods can be implemented in other additive modalities (e.g., laser, e-beam, binder-jet, directed-energy deposition, etc.) that implement different energy sources to fuse and/or melt build material layers. Embodying systems and methods can be implemented in various additive modalities and applied to assorted materials (e.g., metal, non-metal, polymer, ceramics, composites, etc.).

The AM machine control can be based on material property prediction model feedback in accordance with embodiments. AM machine and process parameter settings are obtained, step 105. These machine and process parameter settings represent the goal parameter for the AM machine undergoing control by process 100. In one embodiment, the machine and process parameters can include laser power, laser scan-speed, beam diameter, gas-flow, powder-bed layer thickness, build-chamber temperature, etc.

Data from sensors monitoring the AM machine and process parameters is accessed, step 110. The sensors collect data on a first set of monitored physical condition parameters. These physical parameters are the values of, for example, power, scan-speed, beam diameter that are achieved (i.e., actual, realized, resultant value) by the process parameter settings. The difference ($\delta x$) between the parameter settings and their realized values is calculated.

The AM machine and process parameter settings (x), the monitored physical values, and their difference ($\delta x$) are provided to one or more material property prediction models, step 115. In accordance with embodiments, a Bayesian Hybrid Model (BHM) can be among the prediction models. The predictive models can include, in addition to BHM, other probabilistic, artificial intelligence, machine learning, deep-learning, and physics-based material property prediction models. In some implementations, more than one type of predictive models can be used to arrive at corrective compensation values.

The BHM model can be trained using experimental measurements of product anomalies (e.g., pores, cracks, lack-of-fusion, surface roughness), physical and mechanical properties etc. (e.g., hardness, tensile, low cycle fatigue, creep), as a function of AM machine and process parameters. This training can be done initially—prior to the model's use. In accordance with embodiments, the BHM model need not be updated during a particular build process. However, the BHM model can be updated prior to subsequent builds if more experimental data is available from subsequent measurements—i.e., upgrades can be pushed to the BHM model. In accordance with embodiments, an updated BHM model can be used as a material property prediction model in a subsequent build process.

A prediction value (Y') can be calculated for one or more material properties for the build part, step 120. The prediction value (Y') is a function of the machine and process parameters (x) plus their difference from the monitored sensor data ($\delta x$), with a range based on the predetermined target range, which can be represented as—Y'=Y±$\Delta$y=f(x+$\delta x$).

If a determination is made that the predicted value (Y') is within the predetermined target range, step 125, process 100 returns to step 110. When updated sensor data is available, process 100 can then repeat steps 115, 120, 125 in a loop. If the determination (step 125) indicates that predicted value (Y') is outside the predetermined target range (e.g., below a lower specified limit (LSL), above an upper specified limit (USL), or above/below a threshold value), process 100 triggers a control unit, step 130.

The control unit provides commands, step 135, to reset and/or compensate the AM machine and/or process parameter settings. The commands are chosen derived from the AM machine and process parameters. These reset/compensated setting values are then provided to the material prediction model along with monitored sensor data. In accordance with embodiments, the operation of this closed feedback loop can continue during the build process. The loop can occur in real-time, or at periodic, irregular, or specified intervals (e.g., upon attaining particular build milestones).

Figure 2:
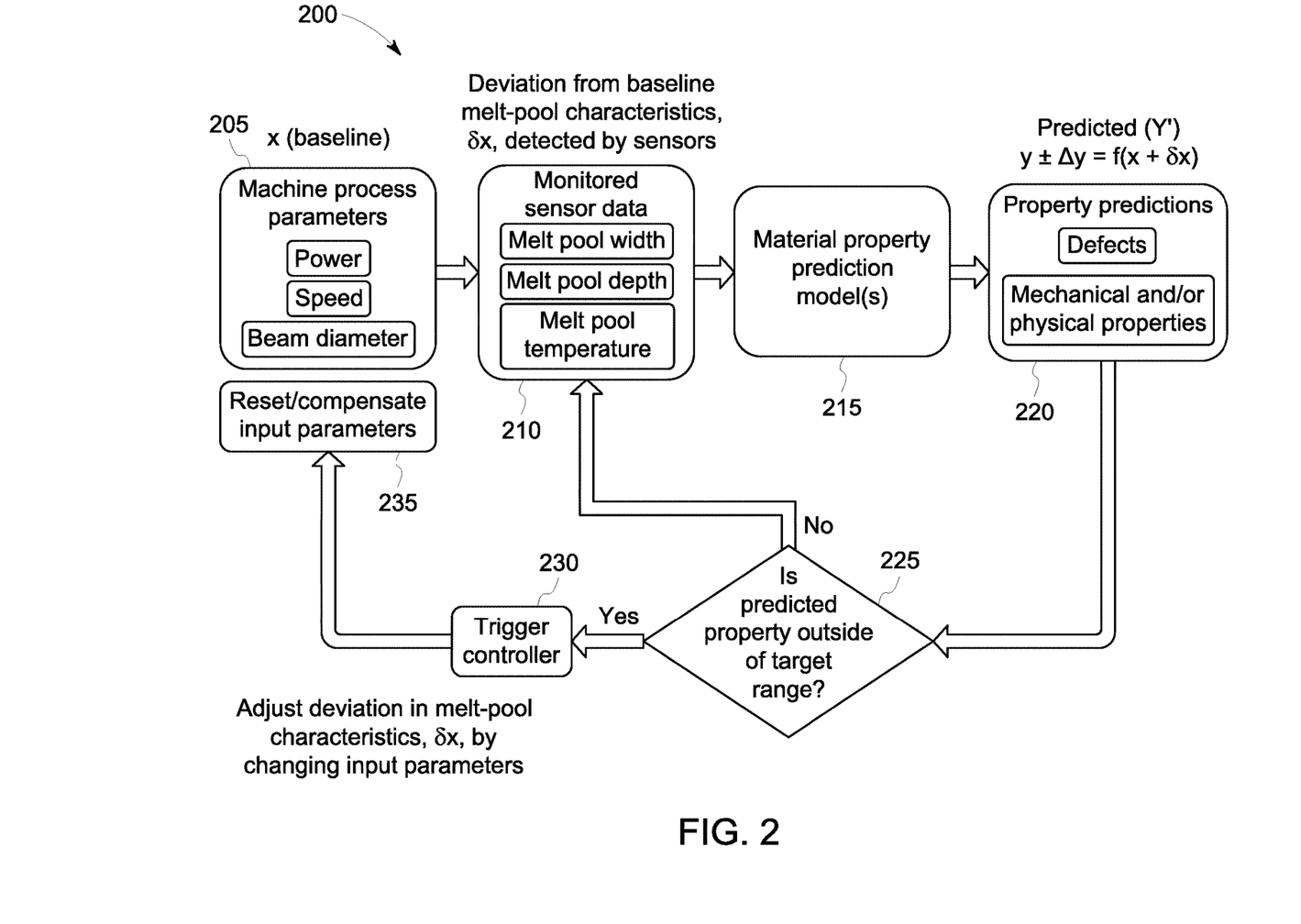
FIG. 2 is a second flow diagram for control of an additive manufacturing machine build process in accordance with embodiments.

FIG. 2 is a flow diagram of process 200 for control of an additive manufacturing machine build process in accordance with embodiments. The control is based on material property prediction model feedback in accordance with embodiments. AM machine and process parameter settings are obtained, step 205. These process parameter settings represent the goal parameter for the AM machine undergoing control by process 200. In this embodiment, the process parameters can include laser power, scan speed, beam diameter, gas-flow, powder-bed layer thickness, build-chamber temperature, etc.

Data from sensors monitoring the AM machine and process parameters is accessed, step 210. The sensors collect data on a second set of monitored physical condition parameters. These physical parameters are the values of, for example, melt-pool characteristics (e.g., width, depth, temperature, temperature-gradient) that are achieved from the interaction between material and machine and process parameters. The difference ($\delta x$) between the baseline melt-pool characteristics based on the machine and process parameter settings (e.g., per machine specifications and/or historic experimental or theoretical data) and the melt-pool characteristics as detected by the sensors during the build process is calculated.

The monitored physical values (x), such as melt-pool width, depth, temperature and gradients, and the difference from baseline characteristics ($\delta x$) are provided to one or more material property prediction models, step 215.

A prediction value (Y') for one or more material properties for the build part can be calculated for each property, step 220. The prediction value (Y') is a function of the baseline physical conditions (i.e., melt-pool characteristics), x, plus their difference from the monitored sensor data (i.e., deviation in melt-pool characteristics), $\delta x$, with a range based on the predetermined target range—Y'=Y±$\Delta$y=f(x+$\delta x$).

If a determination is made that the predicted value (Y') is within the predetermined target range, step 225, process 200 returns to step 210. When updated sensor data is available, process 200 can then repeat steps 215, 220, 225 in a loop. If the determination (step 225) indicates that predicted value (Y') is outside the predetermined target range (e.g., below a lower specified limit, above an upper specified limit, or above/below a threshold value), process 200 triggers a control unit, step 230.

The control unit provides commands, step 235, to reset and/or compensate the melt-pool characteristics by changing the AM machine and process parameter settings. The commands are chosen per machine specifications and/or historic experimental or theoretical data that provide relationship between the measured process variables (or melt-pool signature or characteristics) and the AM machine and process parameters. These reset/compensated setting values are then provided to the material prediction model along with monitored sensor data. In accordance with embodiments, the operation of this closed feedback loop can continue during the build process. The loop can occur in real-time or at periodic, irregular, or specified intervals (e.g., upon attaining particular build milestones).

Figure 3:
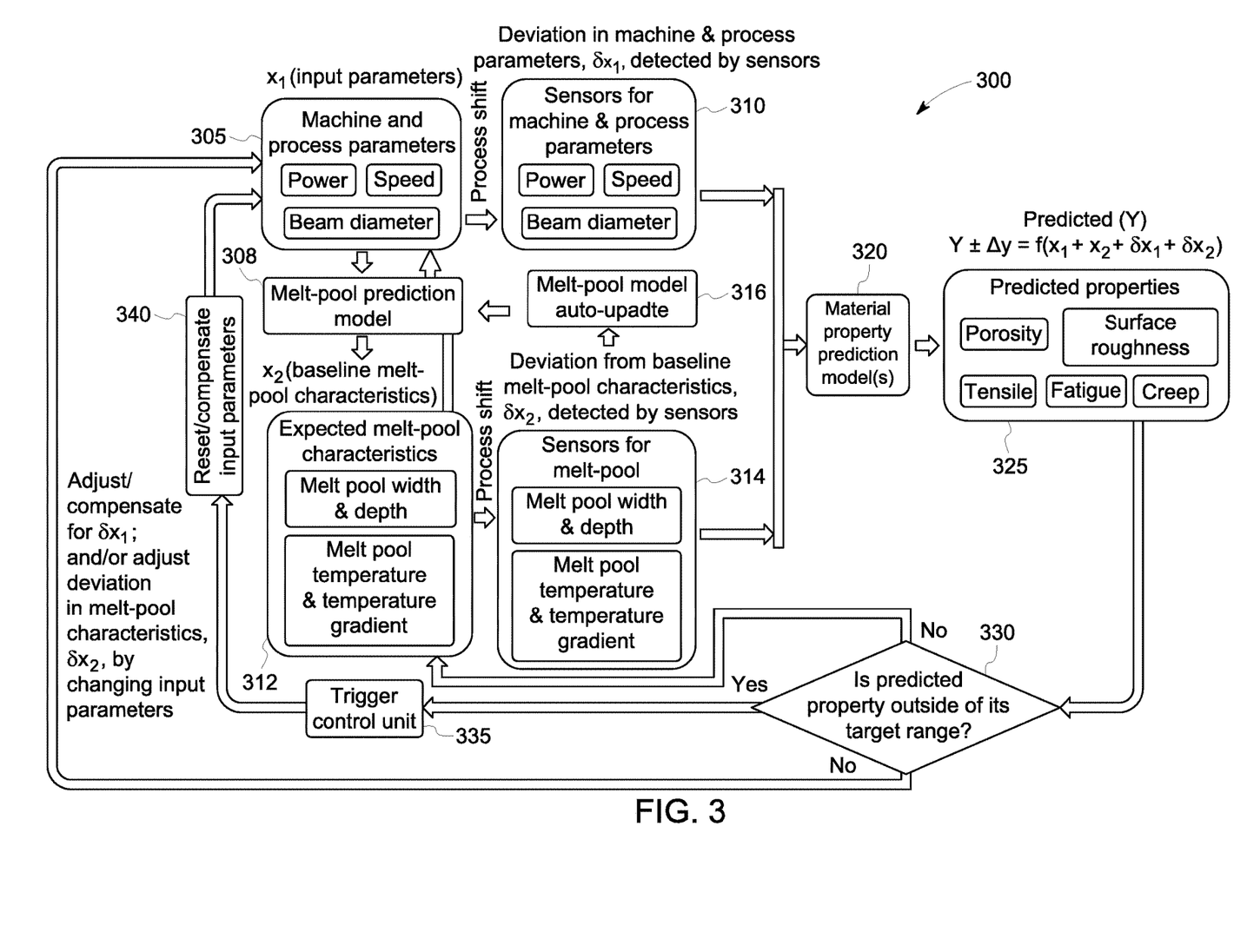
FIG. 3 is third flow diagram for control of an additive manufacturing machine build process in accordance with embodiments.

FIG. 3 is a flow diagram of process 300 for control of an additive manufacturing machine build process in accordance with embodiments. The control is based on material property prediction model feedback in accordance with embodiments. AM machine and process parameter settings are obtained, step 305. These process parameter settings represent the goal parameter for the AM machine undergoing control by process 300.

Data from sensors monitoring the AM machine and process parameters is accessed, step 310. These physical parameters are the values of, for example, laser power, scan-speed, beam diameter, gas-flow, powder-bed layer-thickness, process chamber temperature, that are realized by the machine and process parameter settings. The difference ($\delta x_1$) between the machine and process parameter settings and their realized values (i.e., as measured by sensors) is calculated.

Additionally, in this embodiment, data from sensors monitoring other physical build parameters of the AM machine are accessed, step 314. These physical parameters can be the values of, for example, melt-pool characteristics (e.g., width, depth, temperature, temperature gradient) that are realized by the machine and process parameter settings. A difference ($\delta x_2$) is calculated between the monitored sensor data melt-pool characteristics and the expected (baseline) melt-pool characteristics, step 312. These expected melt-pool characteristics are based on the machine and process parameter settings (e.g., per machine specifications and/or historic, experimental, theoretical data). This difference is provided, as input for an auto-update of a melt-pool model, step 316. The melt-pool model determines, step 308, the expected (baseline) melt-pool characteristics, step 312.

The AM machine and process parameter settings ($x_1$), the baseline melt-pool characteristics ($x_2$), the monitored physical values from the sensors, and their respective difference from baseline configurations settings ($\delta x_1$, $\delta x_2$) are provided to one or more material property prediction models, step 320.

A property prediction value (Y) for one or more properties for the build part can be calculated for each property, step 325. The prediction value (Y) is a function of at least one of the machine and process parameters ($x_1$), melt-pool characteristics ($x_2$), and their respective differences from their respective monitored sensor data ($\delta x_1$, $\delta x_2$), with a range based on the predetermined target range—$Y=Y\pm\Delta y=f(x_1+x_2+\delta x_1+\delta x_2)$.

This property prediction value (Y) can be a combined prediction incorporating one or more prediction values (Y', Y''), where prediction value (Y') is a function of the machine process parameters plus their difference from the monitored sensor data, with a range based on the predetermined target range—$Y'=Y_1\pm\Delta y_1=f(x_1+\delta x_1)$; and where the prediction value (Y'') is a function of the baseline melt pool characteristics plus their difference from the monitored sensor data, with a range based on the predetermined target range—$Y''=Y_2\pm\Delta y_2=f(x_2+\delta x_2)$.

In accordance with implementations, a user can select if one or both prediction values (Y', Y'') are to be met. If predicted material properties (Y') are out of bound then machine and process parameters ($x_1$) must be adjusted to compensate the measured differences. If predicted material properties (Y'') are out of bound, melt-pool characteristics ($x_2$) must be adjusted to compensate the deviation, which can also be done by adjustment of one or more machine and process parameters ($x_1$). Commands to enable control can be determined by either machine baseline settings, historic experimental/theoretical data or prediction model which establishes relationship between machine and process parameters and melt-pool characteristics.

If a determination is made that the prediction value (Y) is within the predetermined target range, step 330, process 300 returns to a loop of steps 305-316. If the determination (step 330) indicates that prediction value (Y) is outside the predetermined target range (e.g., respectively below a lower specified limit, above an upper specified limit, or above/below a threshold value), process 300 triggers a control unit, step 335.

The control unit provides commands to reset and/or compensate, step 340, the melt-pool characteristics by changing the AM machine and process parameter settings. The commands are chosen to set the melt-pool characteristics, such as melt-pool width/depth/temperature, as a function of both the AM machine and process parameters (e.g., laser power, scan-speed, beam diameter, gas-flow, etc.). These reset/compensated setting values are then provided to the material prediction model along with monitored machine and process parameters and melt-pool characteristics. In accordance with embodiments, the operation of this closed feedback loop can continue during the build process. The loop can occur in real-time or at periodic, irregular, or specified intervals (e.g., upon attaining particular build milestones).

Figure 4A:
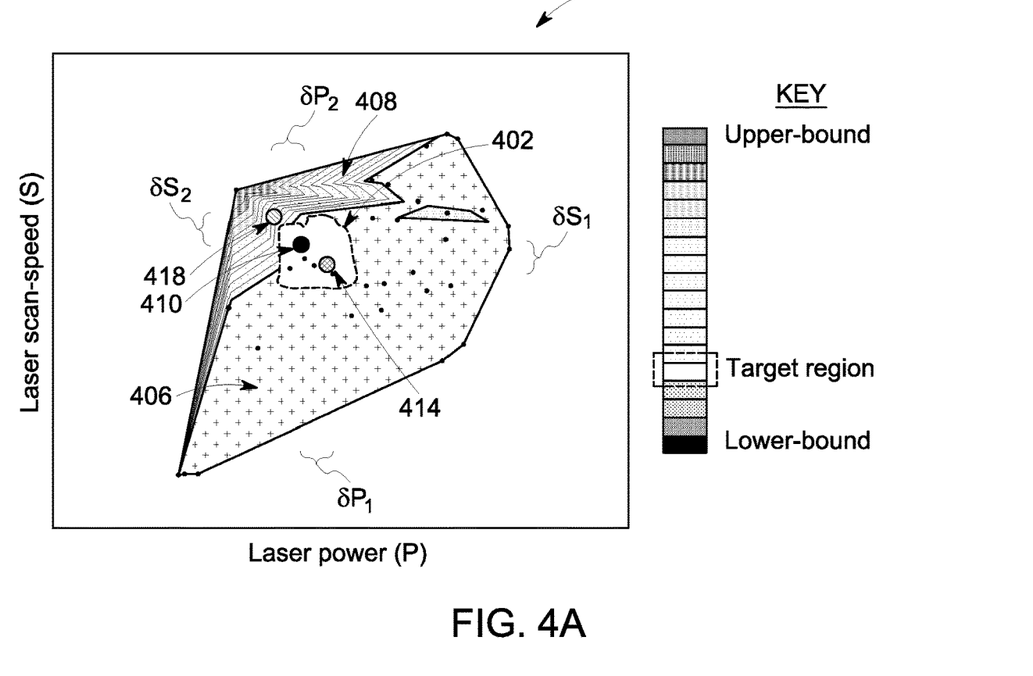
FIG. 4A depicts a laser power versus scan-speed response surface for material property values in accordance with embodiments.

FIG. 4A depicts speed versus power response surface 400 for material parameter values in accordance with embodiments. Response surface 400 is illustrative of the process shift and/or drift that can occur during an AM build. This shift and/or drift can result in an anomaly or defect in the build product. Response surface 400 illustrates the considerations made in determining if input process parameter(s) need adjustment to maintain the CTQ goal(s) for a particular product build.

The response surface includes a target region 402 situated within the lower-bound region 406 and the upper-bound region 408 of the response surface. The target region is the build product parameter goal(s). This target can be based on product design specifications and performance criteria. Baseline parameter set 410 represents the product build goal.

During an AM build, shift and or drift for power, speed, beam can cause the product build properties to move off of the target product build properties. For example, predicted product build property 414 is representative of the predicted product build property resulting from sensor readouts for power, speed, and beam characteristics. Predicted build property 414 is within target region 402. There is no need to adjust the AM machine process parameter(s) setting. Difference $\delta S_1$ represents the delta between the baseline laser scan speed and the measured scan-speed. Difference $\delta P_1$ represents the delta between the baseline laser power and the measured laser power.

Predicted product build property 418 is representative of the predicted product build property resulting from a second set of sensor readouts for power, speed, and beam characteristics. Predicted build property 418 is external to target region 402. This excursion beyond the target range can be due to a deviation in AM build process parameters (e.g., the monitored sensor data for machine and process parameters being different from the machine and process parameters expected from the original command settings). In this circumstance, the control unit would be triggered (FIG. 3; step 335) to provide commands to reset and/or compensate the AM machine and process parameter settings.

Difference $\delta S_2$ represents the delta between the baseline laser scan speed and the measured scan speed. Difference $\delta P_2$ represents the delta between the baseline laser power and the measured laser power.

Figure 4B:
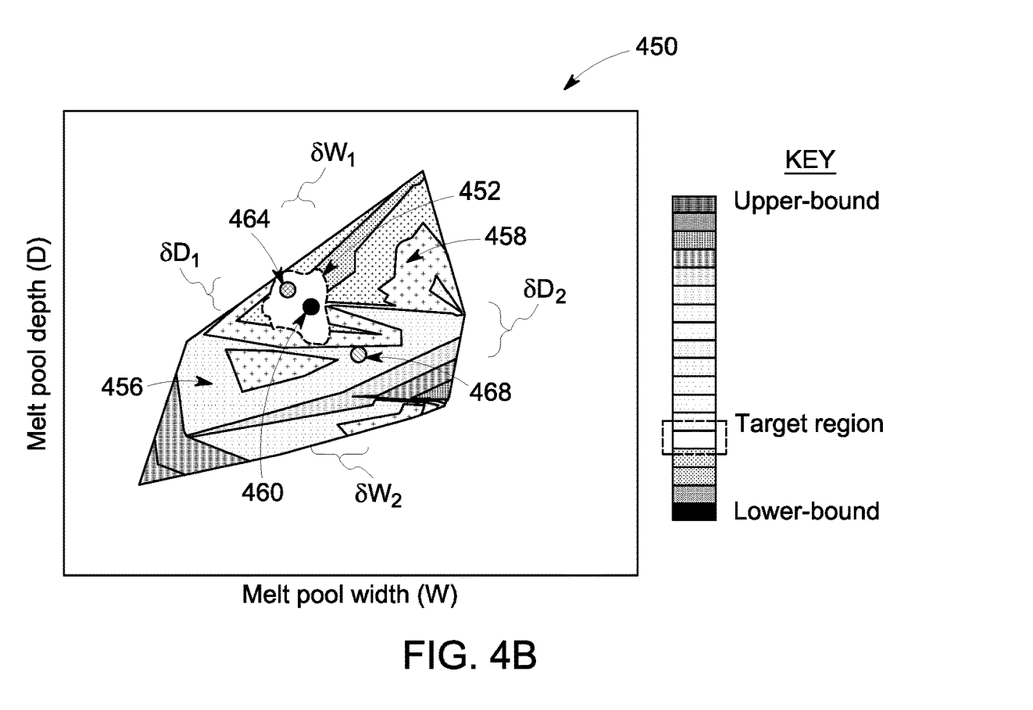
FIG. 4B depicts a melt-pool width versus depth response surface for material property values in accordance with embodiments.

FIG. 4B depicts melt-pool width versus depth response surface 450 for material properties in accordance with embodiments. Response surface 450 is illustrative of the process shift and/or drift that can occur during an AM build. This shift and/or drift can result in an anomaly or defect in the build product. Response surface 450 illustrates the considerations made in determining if input machine and process parameter(s) need adjustment to maintain the CTQ goal(s) for a particular product build.

The response surface includes a target region 452 situated within the lower-bound region 456 and the upper-bound region 458 of the response surface. The target region is the build product property goal(s). This target can be based on product design specifications and performance criteria. Baseline parameter set 460 represents the product build goal.

During an AM build, shift and/or drift of melt-pool width and/or depth can cause the product build properties to move off of the target product build properties. For example, predicted product build property 464 is representative of the predicted product build property derived from sensor readouts for melt-pool width and/or depth characteristics.

The derivation of the expected melt-pool characteristics from the melt-pool sensor readings can be accomplished by providing the melt-pool sensor readings to the melt-pool model and the melt-pool prediction model (FIG. 3; steps 308, 316).

In the illustrated example, predicted build property 464 is within target region 452. There is no need to adjust the AM machine and process parameter(s) setting. Difference $\delta W_1$ represents the delta between the baseline melt-pool width and the measured melt-pool width. Difference $\delta D_1$ represents the delta between the baseline melt-pool depth and the measured melt-pool depth.

Predicted product build property 468 is representative of the predicted product build property resulting from a second set of sensor readouts for melt-pool width and/or depth characteristics. Predicted build property 468 is external to target region 452. This excursion beyond the target range can be due to a deviation from baseline melt-pool width and/or depth characteristics, likely caused by deviation in AM machine and process parameters (e.g., the monitored sensor data for melt-pool width and/or depth characteristics, and/or machine and process parameters being different from their baseline settings). In this circumstance, the control unit would be triggered (FIG. 3; step 335) to provide commands to reset and/or compensate the AM machine and process parameter, and/or baseline melt-pool width and/or depth characteristics settings.

Difference $\delta W_2$ represents the delta between the baseline melt-pool width and the measured melt-pool width. Difference $\delta D_2$ represents the delta between the baseline melt-pool depth and the measured melt-pool depth.

Figure 5:
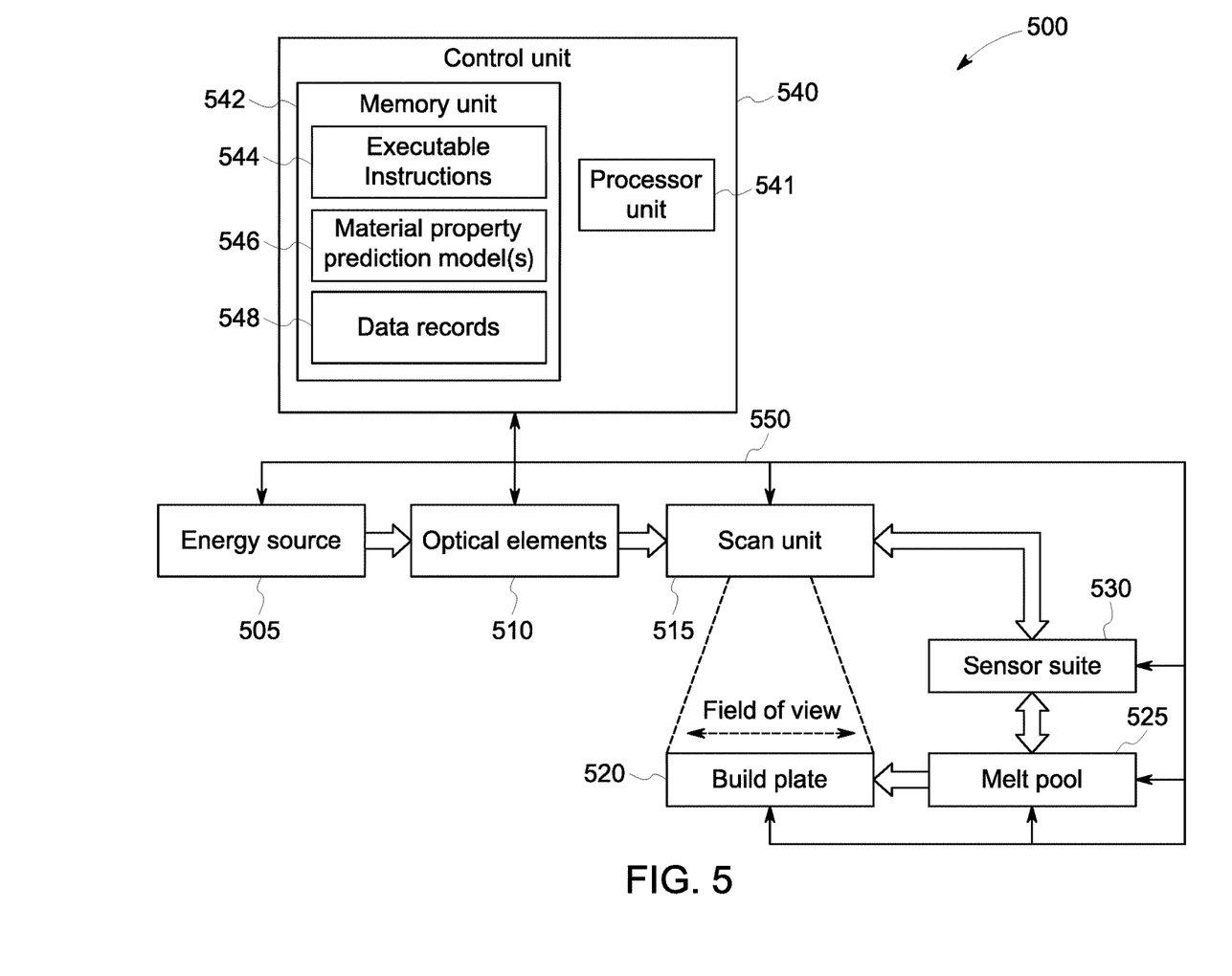
FIG. 5 is a schematic depiction of an additive manufacturing machine system having material property prediction model feedback control in accordance with embodiments.

FIG. 5 is a schematic depiction of additive manufacturing machine 500, with material property prediction model feedback control, in accordance with embodiments. Energy source 505 can form an energy source (e.g., laser) that is focused by optical elements 510 and provided to scan unit 515. It should be readily understood that embodying systems and methods are not limited by the nature and/or type of energy source. Scan unit 125 scans the beam in an x-y plane across build plate 520. As successive layers are produced, build plate 520 is lowered and the deposition material is refreshed from melt-pool 525.

Control unit 540 can include processor unit 541 and memory unit 542. The memory unit can store executable instructions 544. The control processor can be in communication with components of system 500 across local control/data network 550 and/or electronic communication networks. Processor unit 541 can execute executable instructions 544, which cause the processor to perform material property prediction model feedback control of additive manufacturing machine 500 in accordance with embodiments. Memory unit 542 can provide the control processor with local cache memory and storage memory to store, for example, material property prediction model(s) 546 and data records 548.

Material property prediction model(s) 546 can include one or more of BHM, probabilistic, artificial intelligence, machine learning, deep-learning and physics-based material property prediction models. Data records can provide storage for AM machine and process parameter settings, sensor data, product CAD files, etc.

In accordance with embodiments, sensor suite 530 can monitor the achieved/realized machine and process parameters and melt-pool characteristics. The sensor suite can include various different sensor technology, dependent on what is being monitored/measured—e.g., this technology can include optical detectors, image capture devices, line array laser sensors, photo-diodes, mechanical measurement devices, infra-red camera, thermo-couples, gas-flow meters, temperature and pressure gauges, etc. Embodying systems and methods are not limited to any one sensor technology.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable program instructions that when executed may instruct and/or cause a controller or processor to perform methods discussed herein such as a method to predict AM machine and process parameter value adjustments to produce a part within a predetermined target range, as disclosed above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method of additive manufacturing machine (AMM) control with a closed feedback loop, the AMM configured to manufacture a part, the method comprising: obtaining AMM machine and process parameter settings as a physical conditions goal for the AMM for an ongoing build process; accessing sensor data for a set of monitored physical conditions in the AMM; calculating a respective difference between the physical conditions goal for the AMM and respective elements of the set of monitored physical conditions; providing the AMM machine and process parameter settings, the set of monitored physical conditions, and the respective differences to one or more material property prediction models; computing a respective predicted value for one or more material properties for the part; wherein the respective predicted value is a function of the AMM machine and process parameter settings plus their respective difference from the respective elements of the set of monitored physical conditions; comparing the respective predicted value to a respective predetermined target range for the one or more material properties for the part; based on a determination that each respective predicted value is within the respective predetermined target range, maintaining the process parameter settings; based on a determination that one or more of the respective predicted value is outside the respective predetermined target range, generating commands to compensate the process parameter settings; and repeating the closed feedback loop at intervals of time during the build process.

2. The method of claim 1, including determining the physical conditions goal for the AMM from at least one of the AMM machine and process parameter settings and a historic experimental data set for the AMM machine.

3. The method of claim 1, including determining the respective predetermined target range based on melt-pool characteristics, part geometry, and expected part properties based on the AMM machine and process parameter settings.

4. The method of claim 1, the one or more material property prediction models including a Bayesian Hybrid Model.

5. The method of claim 1, including calculating the respective predicted value based on applying a respective one or more of the AMM machine and process parameter settings to a respective modeled response within the one or more material property prediction models.

6. The method of claim 1, wherein the set of monitored physical conditions accessed during the accessing the sensor data includes at least one of the laser power, beam diameter, scan speed, gas-flow, chamber temperature, and powder-bed layer-thickness.

7. The method of claim 1, wherein the set of monitored physical conditions accessed during the accessing the sensor data includes at least one of melt-pool depth, melt-pool width, melt-pool temperature and temperature-gradient.

8. The method of claim 7, including extrapolating expected melt-pool physical conditions from the AMM machine and process parameter settings.

9. The method of claim 1,
wherein a first set of monitored physical conditions accessed during the accessing the sensor data includes laser power, beam diameter, and scan-speed;
wherein a second set of monitored physical conditions accessed during the accessing the sensor data includes melt-pool depth, melt-pool width, and melt-pool temperature and temperature-gradient; and
further including extrapolating expected melt-pool physical conditions from the AMM machine and process parameter settings.

10. A non-transitory computer-readable medium having stored thereon executable instructions when executed by a processor unit cause the processor unit to perform a method of additive manufacturing machine (AMM) control, the AMM configured to manufacture a part, the method comprising: obtaining AMM machine and process parameter settings as a physical conditions goal for the AMM for an ongoing build process; accessing sensor data for a set of monitored physical conditions in the AMM; calculating a respective difference between the physical conditions goal for the AMM and respective elements of the set of monitored physical conditions; providing the AMM machine and process parameter settings, the set of monitored physical conditions, and the respective differences to one or more material property prediction models; computing a respective predicted value for one or more material properties for the part; wherein the respective predicted value is a function of the AMM machine and process parameter settings plus their respective difference from the respective elements of the set of monitored physical conditions; comparing the respective predicted value to the respective predetermined target range for the one or more material properties for the part; based on a determination that each respective predicted value is within the respective predetermined target range, maintaining the AMM machine and process parameter settings; based on a determination that one or more of the respective predicted value is outside the respective predetermined target range, generating commands to compensate the AMM machine and process parameter settings; and repeating a closed feedback loop at intervals of time during the build process.

11. The non-transitory computer-readable medium of claim 10, the executable instructions further configured to cause the processor unit to perform the method, including determining the physical conditions goal for the AMM from at least one of the AMM machine and process parameter settings and a historic experimental data set for the AMM machine.

12. The non-transitory computer-readable medium of claim 10, the executable instructions further configured to cause the processor unit to perform the method, including determining the respective predetermined target range based on melt-pool characteristics, part geometry, and expected part properties based on the AMM machine and process parameter settings.

13. The non-transitory computer-readable medium of claim 10, the executable instructions further configured to cause the processor unit to perform the method, including calculating the respective predicted value based on applying a respective one or more of the AMM machine and process parameter settings to a respective modeled response within the one or more material property prediction models.

14. The non-transitory computer-readable medium of claim 10, the executable instructions further configured to cause the processor unit to perform the method, wherein the set of monitored physical conditions accessed during the accessing the sensor data includes laser power, beam diameter, scan-speed, gas-flow, powder-bed layer-thickness and process chamber temperature.

15. The non-transitory computer-readable medium of claim 10, the executable instructions further configured to cause the processor unit to perform the method, wherein the set of monitored physical conditions accessed during the accessing the sensor data includes melt-pool depth, melt-pool width, and melt-pool temperature and temperature gradient.

16. The non-transitory computer-readable medium of claim 15, the executable instructions further configured to cause the processor unit to perform the method, including extrapolating expected melt-pool physical conditions from the AMM machine and process parameter settings.

17. The non-transitory computer-readable medium of claim 10, the executable instructions further configured to cause the processor unit to perform the method,
wherein a first set of monitored physical conditions accessed during the accessing the sensor data includes laser power, beam diameter, scan-speed, gas-flow, powder-bed layer-thickness and process chamber temperature;

wherein a second set of monitored physical conditions accessed during the accessing the sensor data includes melt-pool depth, melt-pool width, and melt-pool temperature and temperature gradients; and further including extrapolating expected melt-pool physical conditions from the AMM machine and process parameter settings.

18. A system comprising:

an additive manufacturing machine (AMM) having a control unit including a processor and a memory unit, the AMM configured to manufacture a part;

the memory unit including executable instructions that cause the processor to perform a method, the method including:

obtaining AMM machine and process parameter settings as a physical conditions goal for the AMM for an ongoing build process;

accessing sensor data for a set of monitored physical conditions in the AMM;

calculating a respective difference between the physical conditions goal for the AMM and respective elements of the set of monitored physical conditions;

providing the AMM machine and process parameter settings, the set of monitored physical conditions, and the respective differences to one or more material property prediction models;

computing a respective predicted value for one or more material properties for the part; wherein the respective predicted value is a function of the AMM machine and process parameter settings plus their respective difference from the respective elements of the set of monitored physical conditions;

comparing the respective predicted value to a respective predetermined target range for the one or more material properties for the part;

based on a determination that each respective predicted value is within the respective predetermined target range, maintaining the AMM machine and process parameter settings;

based on a determination that one or more of the respective predicted value is outside the predetermined respective predetermined target range, generating commands to compensate the AMM machine and process parameter settings; and repeating a closed feedback loop at intervals of time during the build process.

19. The system of claim 18, the executable instructions including instruction that cause the processor to perform the method including: determining the physical conditions goal for the AMM from the AMM machine and process parameter settings; determining the respective predetermined target range based on melt-pool characteristics, part geometry, and expected part properties based on the AMM machine and process parameter settings; and calculating the respective predicted value based on applying a respective one or more of the AMM machine and process parameter settings to a respective modeled response within the one or more material property prediction models.

20. The system of claim 18, the executable instructions including instruction that cause the processor to perform the method, wherein a first set of monitored physical conditions includes laser power, beam diameter, scan-speed, gas-flow, powder-bed layer thickness, and process chamber temperature; and wherein a second set of monitored physical conditions includes melt-pool depth, melt-pool width, and melt-pool temperature and temperature-gradient;

the method further including extrapolating expected melt-pool physical conditions from the AMM machine and process parameter settings.

* * * * *